United States Patent
Chen et al.

(10) Patent No.: US 9,106,639 B2
(45) Date of Patent: *Aug. 11, 2015

(54) WIMAX R6 MANAGEMENT PROTOCOL

(71) Applicant: Microsoft Corporation, Redmond, WA (US)

(72) Inventors: Zhihong Chen, Nepean (CA); Randy Kuang, Kanata (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/173,393

(22) Filed: Feb. 5, 2014

(65) Prior Publication Data

US 2014/0153430 A1   Jun. 5, 2014

Related U.S. Application Data

(63) Continuation of application No. 13/454,740, filed on Apr. 24, 2012, now Pat. No. 8,718,076, which is a continuation of application No. 11/712,347, filed on Feb. 28, 2007, now Pat. No. 8,184,644.

(60) Provisional application No. 60/777,656, filed on Feb. 28, 2006.

(51) Int. Cl.
*H04L 12/28* (2006.01)
*H04L 29/06* (2006.01)
*H04L 12/26* (2006.01)
*H04W 92/12* (2009.01)
*H04W 92/14* (2009.01)

(52) U.S. Cl.
CPC ............ *H04L 69/08* (2013.01); *H04L 43/0805* (2013.01); *H04L 43/10* (2013.01); *H04L 43/18* (2013.01); *H04W 92/12* (2013.01); *H04W 92/14* (2013.01)

(58) Field of Classification Search
CPC ....................................................... H04L 12/28
USPC ......................................... 370/328, 401, 410
See application file for complete search history.

(56) References Cited

U.S. PATENT DOCUMENTS

| | | | |
|---|---|---|---|
| 6,360,269 B1 | 3/2002 | Mamros et al. | |
| 7,103,002 B2 | 9/2006 | Bjelland et al. | |
| 7,146,419 B1 | 12/2006 | O'Rourke et al. | |

(Continued)

OTHER PUBLICATIONS

"Notice of Allowance", U.S. Appl. No. 13/454,740, Dec. 20, 2013, 4 pages.

(Continued)

*Primary Examiner* — Andrew Lee
(74) *Attorney, Agent, or Firm* — Brandon Roper; Judy Yee; Micky Minhas

(57) ABSTRACT

Within an access services network (ASN) operable for providing wireless access services to an access terminal and including a base station communicatively coupled to an ASN gateway, a new management protocol is provided for managing the R6 communications. The protocol includes a common set of message types that may be used for data plane, control plane, and individual peer applications communicating over the control plane. In one embodiment, a keepalive procedure or process is used to manage the R6 interface between the ASN gateway and the base station by sending keepalive messages through an established data path tunnel and maintaining one or more keepalive timers.

24 Claims, 4 Drawing Sheets

(56) References Cited

U.S. PATENT DOCUMENTS

| | | |
|---|---|---|
| 7,151,780 B1 | 12/2006 | Belscher et al. |
| 7,801,021 B1 | 9/2010 | Triantafillis et al. |
| 8,184,644 B1 | 5/2012 | Chen et al. |
| 8,670,387 B2* | 3/2014 | MacDonald .......... 370/328 |
| 8,718,076 B2 | 5/2014 | Chen |
| 2003/0187847 A1 | 10/2003 | Lubbers et al. |
| 2004/0013118 A1 | 1/2004 | Borella |
| 2005/0055577 A1 | 3/2005 | Wesemann et al. |
| 2005/0083844 A1* | 4/2005 | Zhu et al. .......... 370/230.1 |
| 2005/0209804 A1 | 9/2005 | Basso et al. |
| 2007/0091897 A1 | 4/2007 | Lee et al. |
| 2007/0130457 A1 | 6/2007 | Kamat et al. |
| 2007/0206542 A1 | 9/2007 | Proctor |
| 2007/0283412 A1 | 12/2007 | Lie et al. |
| 2008/0139206 A1 | 6/2008 | Touray et al. |
| 2011/0058556 A1 | 3/2011 | He |
| 2012/0207116 A1* | 8/2012 | Chen et al. .......... 370/329 |

OTHER PUBLICATIONS

"Notice of Allowance", U.S. Appl. No. 11/712,347, Jan. 10, 2012, 5 pages.

"Non-Final Office Action", U.S. Appl. No. 11/712,347, Apr. 29, 2011, 5 pages.

"Non-Final Office Action", U.S. Appl. No. 11/712,347, Jun. 16, 2009, 5 pages.

"Final Office Action", U.S. Appl. No. 11/712,347, Aug. 30, 2010, 5 pages.

"Non-Final Office Action", U.S. Appl. No. 13/454,740, Jul. 17, 2013, 5 pages.

"Non-Final Office Action", U.S. Appl. No. 11/712,347, Jan. 8, 2010, 6 pages.

\* cited by examiner

WIMAX R6 MANAGEMENT PROTOCOL

CROSS-REFERENCE TO RELATED APPLICATION

This application is a continuation of prior U.S. application Ser. No. 13/454,740 filed Apr. 24, 2012, which is a continuation of, and claims priority to, U.S. patent Ser. No. 11/712,347 filed Feb. 28, 2007, which claims priority under 35 USC 119(e) to U.S. provisional Application Ser. No. 60/777, 656, filed on Feb. 28, 2006, and which is incorporated herein by reference.

BACKGROUND

The Worldwide Interoperability for Microwave Access Forum (WiMAX) has developed a specification that describes a radio interface for wireless data communications. This specification is known as the Institute of Electrical and Electronic Engineers (IEEE) 802.16e-2005 standard, and is incorporated herein by reference. This air interface is similar to Wireless Fidelity (WiFi) (also known as IEEE 802.11, including a, b and g versions) since a user device is connected wirelessly to an access point. However, WiMAX provides higher capacity, allows greater communications distances and provides mobility (access across different access points).

Users gain wireless connectivity in an access service network (ASN) via an access point (AP). WiMAX access points (also known as base stations) are similar to cellular access points, with each base station generally including a tower with antenna(s) situated that are locally controlled and include a base stations (BTS). Once connected, users have the ability to roam from one access point (base station) to another access point.

Within the ASN, each BTS is connected (via wireless or wireline) to a controller node identified as a "gateway" (GW). Each gateway is generally responsible for controlling and communicating with a number of BTSs and is connected to a global network. Control and information relevant to a local BTS exists in the BTS. Control and information relevant to both the ASN of the end users and the BTSs exist in the gateway.

Within a WiMAX network, the ASN is broken down into functional pieces, for example, user security, accounting, mobility and quality of service (QoS). These functional entities reside or are located in the BTS, the gateway or both. Thus, a functional entity may spans both the BTS and gateway. For example, for accounting, an accounting agent exists on the BTS to monitor traffic locally. The agent reports statistics about a user's traffic behavior to the corresponding accounting controller on the gateway.

The definition of the functional entities (including peer applications of processes) and where they are located is defined by the WiMAX Network Working Group (NWG). WiMAX NWG has developed two draft documents describing various definitions and standards relating to the network system architecture for WiMAX networks, known as the (1) WiMAX End-to-End Network Systems Architecture, Stage 2 (Release 1, Aug. 8, 2006) and (2) WiMAX End-to-End Network Systems Architecture, Stage 3 (Release 1, Aug. 8, 2006), which are incorporated herein by reference. Stage 2 describes functional entities within the network while Stage 3 defines interfaces between functional entities.

Communication between each of the peer functional entities on the BTS and gateway takes place via an interface and architecture known as the "R6 reference point" (also referred to as the "R6 interface"). However, these documents do not fully define its operation and architecture. The Stage 2 and Stage 3 documents appear to define a distributed architecture for the R6 reference point, such that each functional entity operates independently, or almost independently, of each other. In this manner, an agent application (or functional entity) in the BTS communicates directly with its corresponding control application (or peer functional entity) in the gateway over a simple User Datagram Protocol (UDP) port. As such, a "peer application" (or process) is generally defined as including two portions or entities—a peer agent entity residing and executing within the BTS and a corresponding peer control entity residing and executing within the gateway, with these two entities communicate with each other. Each agent and corresponding control application may also be referred to by itself as a "peer application." Each peer application or process utilizes both a special protocol header and yet-to-be defined standard messages. Others have suggested that a keep-alive mechanism be utilized per peer application (i.e., application base together performing a main function in the ASN). Though this allows each application to manage its own communications, it requires each application utilize that same procedure to manage its communications with its peer, thus each of the peers must have the functionality to use that same procedure. The WiMAX NWG Stage 2 or 3 documents do not provide any clear proposal relating to these issues for the R6 reference point.

Accordingly, there are needed a common mechanism for the R6 communications management, including a management protocol and methods for managing the R6 interface between the BTS and gateway ASN within a WiMAX ASN.

SUMMARY

In accordance with one embodiment, a method is provided for monitoring a data plane of an R6 reference point within an access services network (ASN) between a base station and an ASN gateway. The method includes establishing a data path tunnel between the base station and the ASN gateway over a data network, and sending one or more KEEPALIVE messages through the data path tunnel.

In accordance with another embodiment, there is provided a computer program embodied on a computer readable medium and operable to be executed by a processor within a communications device or system, the computer program comprising computer readable program code for performing the method described above. In yet another embodiment, an access network is provided with the means for performing the steps described above.

In accordance with yet another embodiment, a method is provided for managing an R6 interface within an access services network (ASN) between a base station and an ASN gateway. The method includes executing a first R6 management process within the base station and executing a second R6 management process within the ASN gateway. The R6 interface is monitored during execution of the first and second R6 management processes for determining the status of R6 interface communications.

In another embodiment, in a WiMAX access services network (ASN) comprising a base station and an ASN gateway within the ASN, there is provided an apparatus for monitoring an R6 interface between the base station and the ASN gateway. The apparatus includes a first R6 interface manager executing within the base station and a second R6 interface manager executing within the ASN gateway. The first and second R6 interface managers exchange one or more KEEPALIVE messages therebetween enabling monitoring of the R6 interface and the status of R6 interface communications.

Other technical features may be readily apparent to one skilled in the art from the following figures, descriptions, and claims.

BRIEF DESCRIPTION OF THE DRAWINGS

For a more complete understanding of various embodiments, and the advantages thereof, reference is now made to the following descriptions taken in conjunction with the accompanying drawings, wherein like numbers designate like objects, and in which.

DETAILED DESCRIPTION

Figure 1:
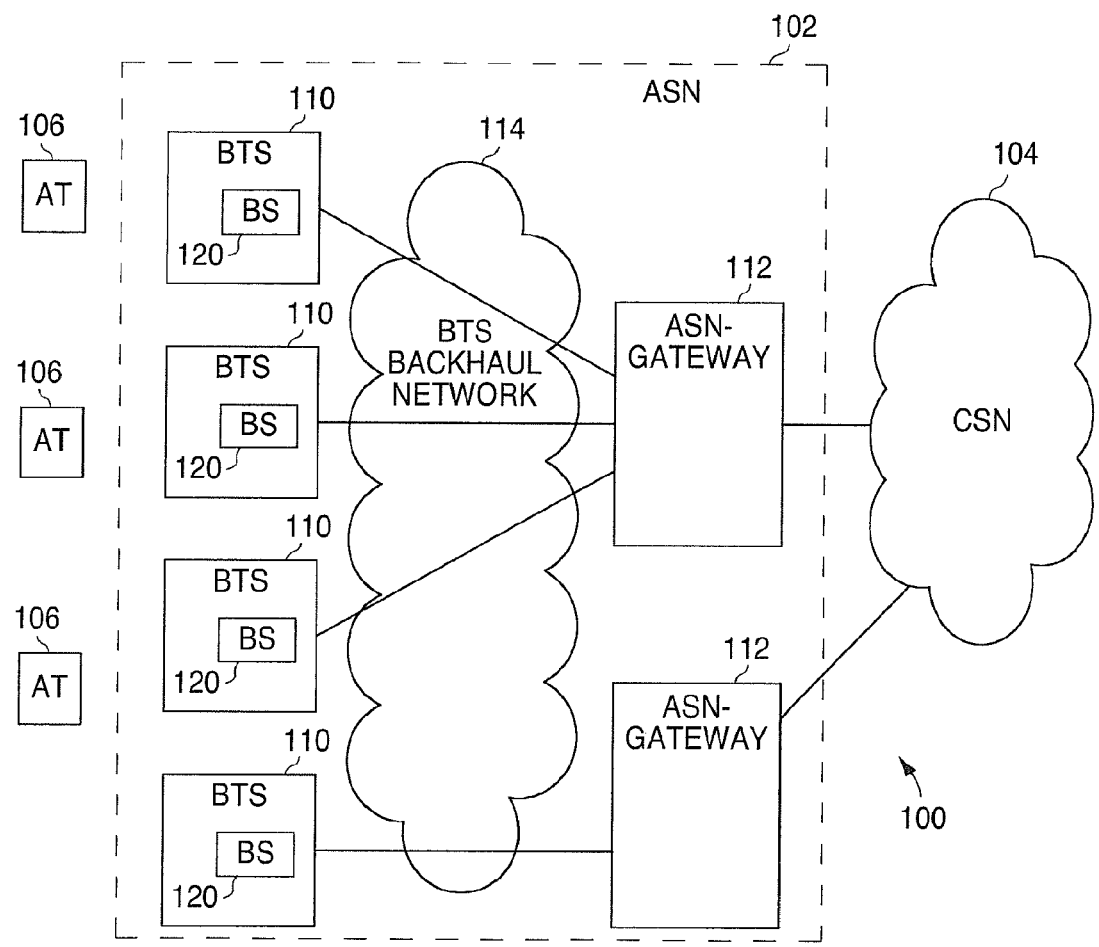
FIG. 1 depicts in block diagram form a wireless communications network.

FIG. 1 illustrates an example communications network architecture or system 100 in accordance with one or more embodiments. The system or network 100 shown in FIG. 1 is for illustration purposes only. Other embodiments of the system 100 may be used without departing from the scope of this disclosure. Reference to "standards" in the following text is meant to encompass existing and future versions of the referenced standards, as well as standards encompassing the principles of one or more embodiments disclosed and claimed herein.

In this example, the system 100 includes an access services network (ASN) 102, a connectivity service network (CSN) 104 (i.e., a data network), and one or more access terminals 106. The ASN 102 includes one or more base stations (identified as a "BTS") 110 communicating with one or more ASN gateways 112 via a network 114. The network 114 may also be referred to as the "BTS backhaul network." In one embodiment, the system 100 (or portions thereof) is a wireless communications network compliant or operating in accordance with the IEEE 802.16e standard (WiMAX). Though only one ASN 102 is shown, the system 100 may include additional ASNs 102.

It will be understood that the system 100 may also be configured or be designed with different configurations. The ASN gateway 112 provides a gateway function between the BTSs 110 and the CSN 104. Each BTS 110 generally includes one or more antennas and various hardware and software components. In addition, each BTS 110 includes one or more BS "instances" (BS) 120 with each BS instance 120 representing a sector, with the BTS 110 controlling the BS instances within a BTS 110. For example, each BTS 110 may include three BTS instances (three sectors).

The CSN 104 may include one or more local area networks ("LAN"), metropolitan area networks ("MAN"), wide area networks ("WAN"), all or portions of a global network, or any other communication system or systems at one or more locations, or combination of these, including the public switched telephone network (PSTN), Internet, packet networks and the like. In one specific embodiment, the CSN 104 is an Internet Protocol (IP) based network. The BTS backhaul network 114 is a data network utilized for communications between the BTSs 110 and the ASN gateways 112. Similarly, it may be configured to include Internet, packet networks and the like. In one specific embodiment, the BTS backhaul network 114 is an Internet Protocol (IP) based network. It will be understood that the CSN 104 and the BTS backhaul network 114 may also be physically the same network, but logically different.

The ASN 102 has coupled thereto one or more access terminals (AT) 106 (several shown). The AT 106 is operable for communicating wirelessly with the ASN 102 over an air interface. Additional or fewer BTSs 110 and ASN gateways 112 may be included in the ASN 102 (or the system 100), with the ATs 106 communicating with one or more BTSs 110 over wireless interfaces. Different configurations of system 100 may be utilized in accordance with the present disclosure.

The ASN 102 typically includes a complete set of network functions to provide radio access to the AT 106 (such as a WiMAX compliant AT), and includes various network elements such as one or more BTSs 110 (and BSs 120) and one or more ASN gateways 112. The ASN 102 defines a logical boundary and represents the aggregation of functional entities and corresponding message flows associated with access services. The BTS 110 typically includes a BS 120 and corresponding antenna (not shown) for providing access functions for the AT 106 1 as well as both WiMAX MAC and PHY compliance. The ASN gateway 112 includes control plane functional entities that are paired with a corresponding functional entity in the BTS 110 (or BS 120), a resident function in the CSN 1041 or a function in another ASN 102 or ASN gateway 112.

It will be understood that the grouping and distribution of functions or functional entities of the system 100 (most notably the ASN 102) realized by one physical device or distributed over multiple physical devices is an implementation choice, provided the functional and interoperability requirements are met.

The structure and functionality of the ASN, BTS, BS, CSN and ASN gateway are generally well-known. Each generally includes various components such as processing units, controllers and network interfaces, which necessarily include but are not limited to, microprocessors, microcontrollers, memory devices, and/or logic circuitry, and these may be adapted to implement various algorithms and/or protocols. No additional description of the conventional functionality and application of ASN, BTS, BS, CSN and ASN gateway, other than as noted herein or relevant for an understanding one or more embodiments, is provided, as these are known to those of ordinary skill in the art.

A reference point is a conceptual point between two groups of functions that reside in different functional entities on each side of the reference point, also referred to as interfaces between the functional entities. These are identified using the nomenclature "RX" reference point, and defined in the standards (e.g., R1—between AT 106 and ASN 102; R3—between ASN 102 and CSN; R4—between ASN 102 and another ASN 102; R6—between BTS 120 and ASN gateway 112; R8—between one BS 110 and another BS 110). This disclosure will focus on the R6 reference point between the BTS 110 and the ASN gateway 112, as described more fully herein.

It will be understood that the ASN 102, the BTS 110, the ASN gateway 112 and the BS 120 may be constructed or configured from any suitable hardware, software, firmware, or combination thereof for providing the functionality known to those of ordinary skill in the art. These devices will include additional functionality as described below in accordance with one or more embodiments.

Other components, devices or networks may be included in the system 100, and FIG. 1 only illustrates but one exemplary configuration to assist in describing the system and operation of various embodiments to those skilled in the art. The system represented in FIG. 1 may be described using different nomenclature or system terminology, such as use of the terms mobile subscriber terminals (MS or MT) (an access terminal), base transceiver stations or base station controllers (BTS or BS), radio network controllers (RNC) and mobile switching centers (MSC), radio access network (ASN), and the use of any given nomenclature to describe a device within the system 100 is not intended to limit the scope of this disclosure.

The AT 106 represents a device utilized by a user or subscriber during communication sessions over/within the system 100. For example, each of the communication devices may include an input/output device having a microphone and speaker to capture and play audio information. Optionally, the communication device 106 may also include a camera and/or a display to capture/display video information. During a communication session, the AT 106 communicates with one or more other devices coupled/connected to the CSN 104 (or within the system 100). In this way, the AT 106 may exchange audio, video, graphical, or other information during a communication session.

The AT 106 may be constructed or configured from any suitable hardware, software, firmware, or combination thereof for transmitting or receiving information over a network. As an example, the AT 106 could represent a telephone, videophone, computer, personal digital assistant, and the like, etc.

The BTS 110 (or BS instance 120) and ASN gateway 112 define the R6 reference point therebetween and are interconnected via one or more communications lines which are usually wired (but may be wireless), or any combination thereof, through the R6 backhaul network 114. System 100 (and CSN 104 and BTS backhaul network 114) may utilize any suitable protocol or protocols, and in a specific embodiment, the communications link (wireless or wireline) between the BTS 110 and the ASN gateway 112 functions in accordance with the Internet Protocol, and in a specific embodiment, in accordance with IPv4 or IPv6.

The R6 reference point includes a set of control (non-bearer) and data (bearer) plane protocols for communication between the BTS 110 and the ASN gateway 112. Generally speaking, the bearer plane (R6e) includes the user data path, while the control plane (R6d) includes protocols for user datapath establishment, modification, and release control in accordance with the AT 106 mobility events. The R6d plane is the "decision point" of the R6 reference point, while the R6e plane is the "enforcement" point." Typically, a data path is established between the BTS 110 and the ASN gateway 112 using one or more data path tunnels between two endpoints (using IP addresses), such as Generic Routing Encapsulation (GRE), MultiProtocol Label Switching (MPLS) or Virtual Local Area Network (VLAN) or other tunneling or data path protocol. Each data path tunnel may be provisioned with one or more sub-channels on a per AT 106 basis, per BS instance 120 basis, and/or per data type basis (e.g., VoIP)). The control path is typically established between the BTS 110 and the ASN gateway 112 using UDP over IP, in accordance with the WiMAX Stage 2/3 specifications. This may be accomplished using IP addresses between two points and/or UDP ports for BS instances 120 on the BTS 110. In one embodiment, the BTS 110 has one IP address and utilizes UDP ports to distinguish among BS instances 120 therein. As described below, client peer application instances (among each BS instance) are distinguishable based on message type in the Stage 3 messaging format specification. In another embodiment, each BS 120 may have a different IP address and utilization of UDP ports for distinguishing among BSs 120 may not be necessary.

Figure 2:
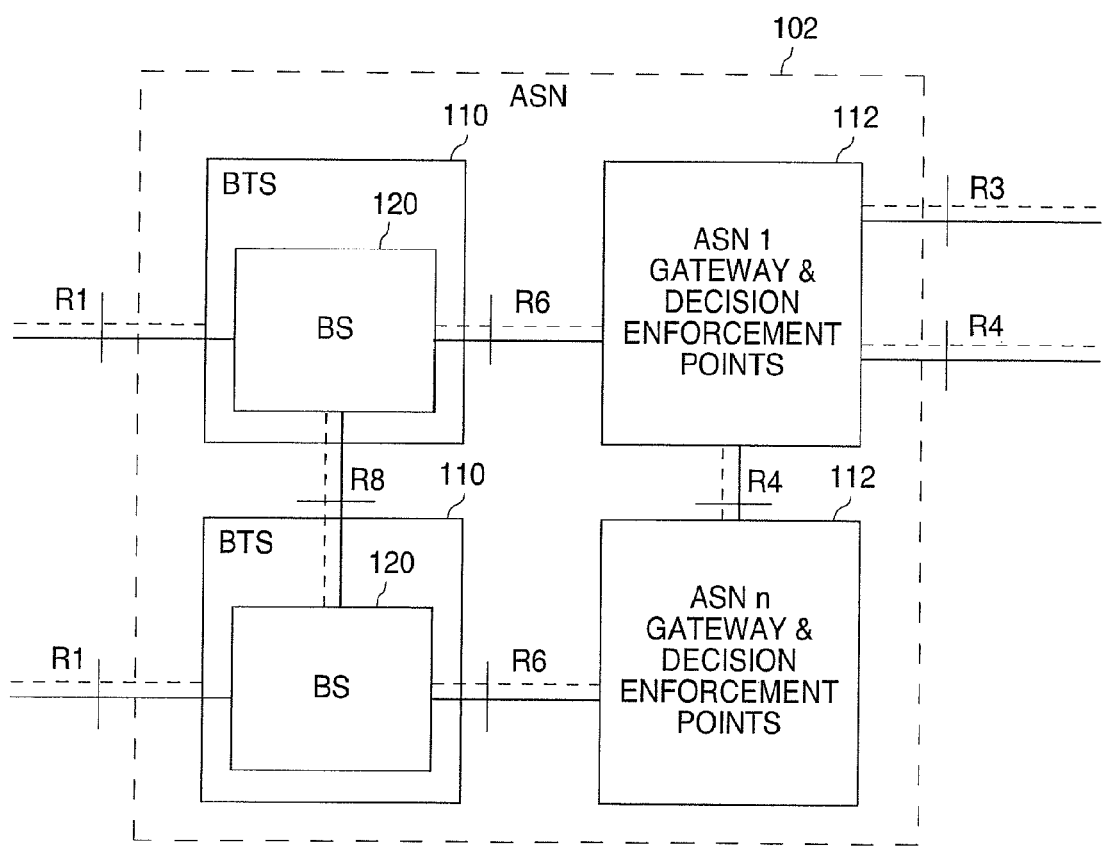
FIG. 2 is an ASN reference model illustrating the various reference points between functional devices associated with the ASN.

Now referring to FIG. 2, there is shown the ASN 102 reference model illustrating the various reference points between functional devices associated with the ASN 102. It will be understood that the BTS 110 may include more than one BS 120.

The present disclosure provides a reliable, manageable and high performance common management protocol for R6 control and data plane management which manages communication peers. The R6 management protocol is provisioned through use of multiple messages (messaging protocol) and additional processes and functionality executing in the BTS 110 and ASN gateway 112. In general, this common R6 management protocol may be used for R6 data plane, R6 control plane, as well as R6 peer applications communications through the control plane.

The following R6 protocol messages are introduced:
HELLO
INITIALIZATION
STATUS
KEEP ALIVE The HELLO message is used to discover remote peer protocol entities. Information carried within the HELLO message includes the originating peer entity's IP address (and/or UDP port) and management type.

The INITIALIZATION message is used to carry management parameters. Information carried within the INITIALIZATION message may include a data path ID for the data path, one or more keepalive timer values, and a maximum PDU size. Various data path configurations may be utilized, as desired, including a GRE tunnel (GRE key), MPLS (MPLS label) and VLAN (VLAN ID).

The STATUS message is used to notify the other peer of the originating peer's own state or state change. The following are some examples of specific types of states defined herein: WAIT_KEEPALIVE (indicates the local peer waiting for its remote peer's KEEPALIVE message); KEEPALIVE TIMEOUT (indicates the KEEPALIVE timer has expired); NORMAL (indicates normal operation state); RX_DOWN (indicates the local data receiving module is down); EXIT (indicates a request for deletion of the tunnel between the BTS 110 and the ASN gateway 112); and EXITED (indicates the tunnel is deleted). STATUS messages are optional, and may be used beneficially to maintain states and increase reliability.

Figure 3:
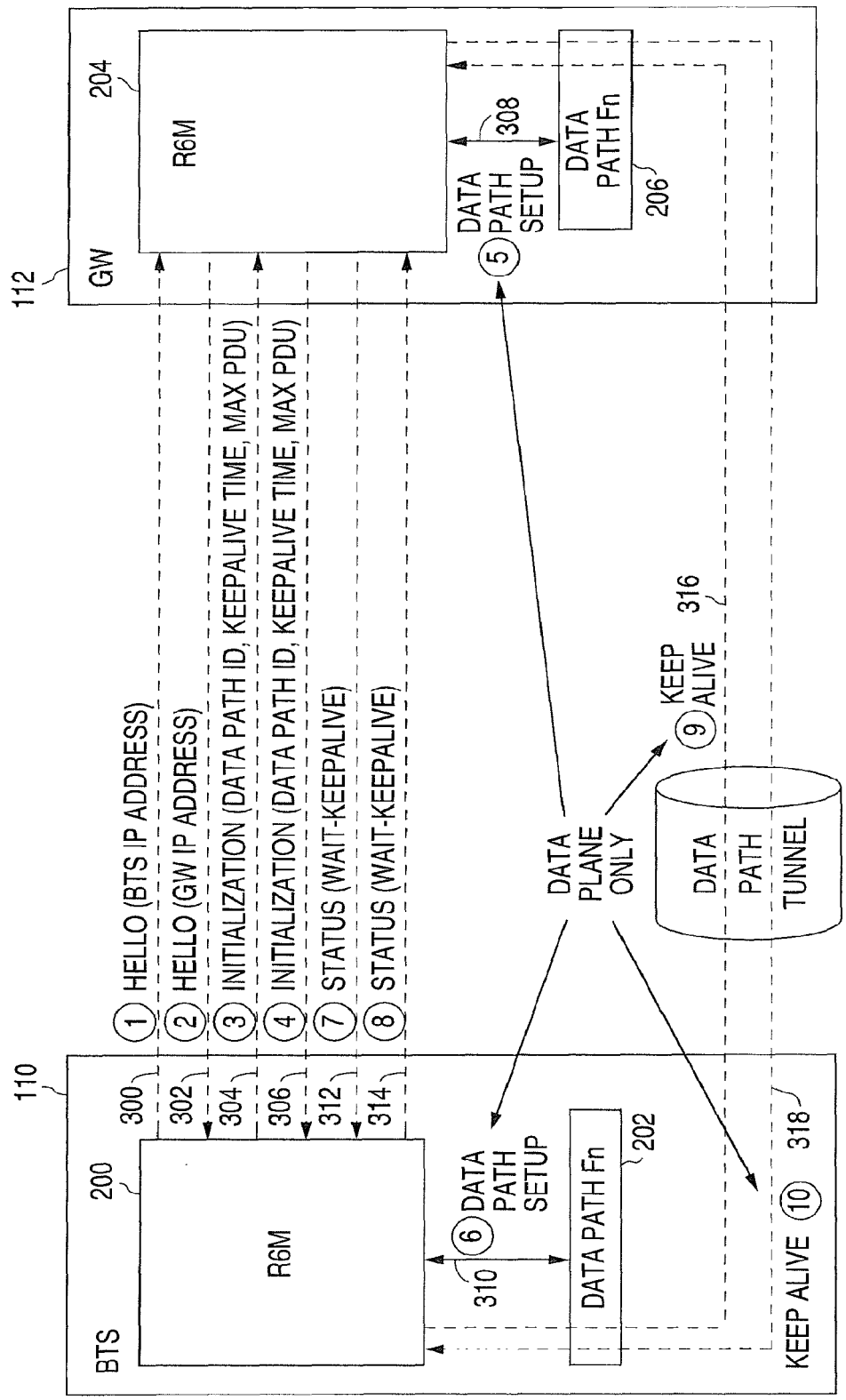
FIG. 3 illustrates one example of a message/process flow for base station entry into the network.

Now referring to FIG. 3, there is shown a diagram of the BTS 110 and ANS gateway 114 pair which illustrates message/process flows for BTS 110 entry into the ASN 102 (e.g., initialization with the ASN gateway 112, such as power-up, restart, etc.). The BTS 110 includes an R6 interface manager 200 (identified by the notation "R6M") or R6 management process. The R6 interface manager 200 is a peer application process executing within the BTS 110. The BTS 110 further includes a data path function 202. The data path function 202 is similarly an application process executing therein. The ANS gateway 112 also includes an R6 interface manager 204 and a data path function 206. The R6 interface manager 204 is a corresponding peer to the R6 interface manager 200 in the BTS 110, while the data path function 206 is similar in functionality to the data path function 202.

Upon entry of the BTS 110 into the ASN 102, the BTS 110 generates a HELLO message (including an IP address of the BTS 110) and transmits it to the ANS gateway 112 (step 300). In response, the ASN gateway 112 generates a HELLO message (including the IP address of the ASN gateway 112) and transmits it to the BTS 110 (step 302). This provides a process or mechanism that allows the BTS 110 and the ANS gateway 112 to discover each other. Typically, the IP address of the ANS gateway 112 is pre-configured and stored at the BTS 110 (alternatively, the BTS 110 may obtain the gateway's IP address by other means prior to generating and sending its HELLO message).

The process continues, and the BTS 110 generates an INITIALIZATION message (including a proposed data path ID, one or more keep-alive time periods, and maximum PDU size) and transmits it to the ANS gateway 112 (step 304). In response, the ASN gateway 112 generates an INITIALIZATION message (including the accepted parameters) and transmits it to the BTS 110 (step 306). This provides each device with the proper parameters and necessary information to set up the data path tunnel. Now with the necessary information, each of the data path functional entities 202, 206 establishes a GRE tunnel with the known IP addresses, data path ID, etc. (steps 308, 310). Though the INITIALIZATION messages (304, 306) are shown exchanging data path parameters, these may also be used by the control plane.

After data path establishment, the BTS 110 generates a STATUS message (a WAIT_KEEPALIVE status message indicating the BTS 110 is waiting for a KEEPALIVE message from the ANS gateway 112) and transmits it to the ANS gateway 112 (step 312). The ASN gateway 112 also generates a STATUS message (a WAIT KEEPALIVE status message indicating the ANS gateway 112 is waiting for a KEEPALIVE message from the BTS 110) and transmits it to the BTS 110 (step 314). This provides status information about one peer's state to the other peer. As noted, STATUS messages are optional but may be beneficial in some implementations.

Both R6 interface manager 200, 204 (in the BTS 110 and ASN gateway 112, respectively) generate and transmit KEEPALIVE messages to their respective peers (steps 316, 318). Connection enablement messages, such as the KEEPALIVE message, are transmission throughput messages that can be sent to verify the enablement or existence of a communications path between two points. This may be done periodically, or may be done in response to certain events and/or timeouts, as described additionally below. The KEEPALIVE messages shown in FIG. 3 are KEEPALIVE messages for the data plane—transmitted through the established data path tunnel. It will be understood the present protocol implements KEEPALIVE messaging (process) for the data plane, and may optionally implement KEEPALIVE messaging for the control plane and/or on an individual peer application basis (via the control plane). This enables utilization of a keepalive mechanism or process distinctly for each of the following areas or functions: data plane, control plane and peer application via the control plane.

Data plane KEEPALIVE messages are transmitted and communicated through the data path tunnel, such as the GRE tunnel previously established between the two data path functions 202, 206 (in the respective BTS and ASN gateway). These messages may follow the WiMAX Stage 3 formatting specification with a data path tunnel-specific header depending on the type/format of data path tunnel (e.g., GRE header). As such, the data plane KEEPALIVE message may include information uniquely identifying the R6 interface managers 200, 204 (through use of a unique function type identifier distinguishing it from other known peer applications currently defined in the WiMAX specifications). Control plane KEEPALIVE messages, if desired for monitoring the control plane of the R6 interface, may be transmitted and communicated in accordance with the Stage 3 messaging specifications over UDP (or within a control tunnel, if one is utilized). Separate KEEPALIVE messages may also be transmitted and communicated by the control plane for use by peers for a given client peer application, such as in accordance with Stage 3 messaging.

Figure 4:
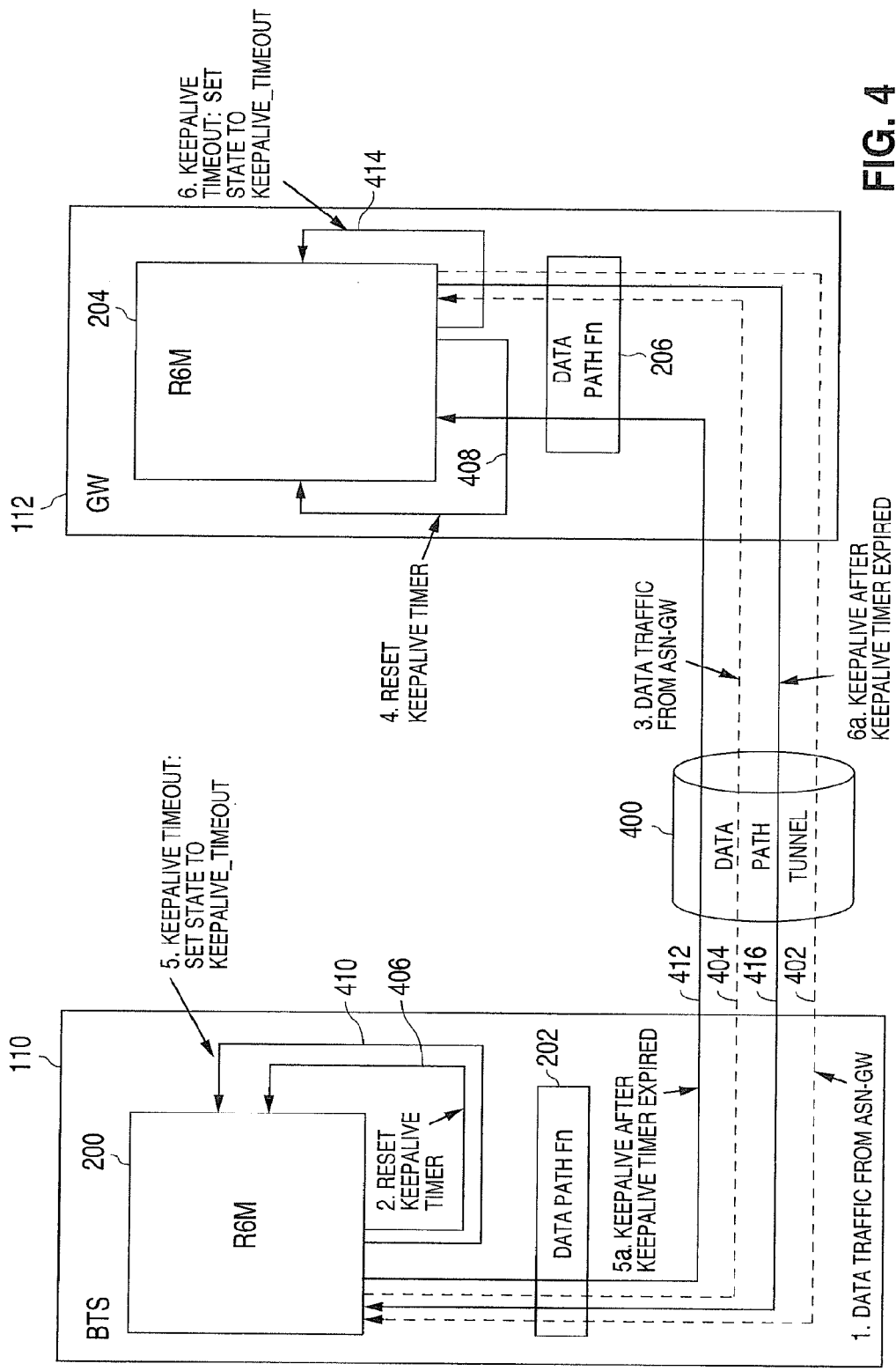
FIG. 4 illustrates one example of a message/process flow for a keep-alive procedure within the data plane.

Now referring to FIG. 4, there is shown a diagram similar to FIG. 3, and which illustrates in more detail an example message/process flow for a data plane keepalive mechanism or process. The dotted lines identified by reference numerals 402 and 404 represent transmission of user data (in the data plane) from the ASN gateway 112 to the BTS 110 and user data flowing from the BTS 110 to the ASN gateway 112, respectively.

During operation, the respective R6 interface managers keep track of their respective KEEPALIVE timers (not shown) programmed with a parameter or value "keepalive time". These parameters may be programmable. In one embodiment, each R6 interface manager 200, 204 maintains a send keepalive timer and a receive keepalive timer.

Upon receipt of user data transmitted from the ASN gateway 112 via the data path tunnel 400 (step 402) or receipt of a KEEPALIVE message from the R6 interface manager 204, the R6 interface manager 200 resets its receive keepalive time (step 406). Likewise, the R6 interface manager 204 resets its receive keepalive timer (step 408) upon receipt of user data transmitted from the BTS 110 via the data path tunnel 400 (step 404) or upon receipt of a KEEPALIVE message from the R6 interface manager 200.

Similarly, when sending user data from the ASN gateway 112 via the data path tunnel 400 or sending a KEEPALIVE message from the R6 interface manager 204 to the BTS 110, the R6 interface manager 204 resets its send keepalive timer. Likewise, the R6 interface manager 200 resets its send keepalive timer when sending user data from the BTS 110 via the data path tunnel 400 (step 404) or sending a KEEPALIVE message from the R6 interface manager 200.

In this manner, transmission of user data from an originating peer and receipt of user data by the receiving peer will result in the receiving and sending peer resetting its respective receive/send timer. As such, no KEEPALIVE messages are transmitted provided user data traffic is flowing normally (and not infrequently) via the path 400. In another embodiment (not shown), the KEEPALIVE messages may be sent periodically notwithstanding the transmission and receipt of user data traffic via data path 400.

The embodiment described above includes both a send and receive timer per R6 interface manager 200, 204. However, a single timer per manager may be utilized and still provide R6 monitoring capabilities as taught herein.

When its send keepalive timer expires, the R6 manager 200 sets its current state (status) to KEEPALIVE_TIMEOUT (step 410) and generates and transmits a KEEPALIVE message via the data path tunnel 400 to the ASN gateway 112 (step 412). Similarly, when its respective send keepalive timer expires, the R6 manager 204 sets its current state (status) to KEEPALIVE_TIMEOUT (step 414) and generates and transmits a KEEPALIVE message via the data path tunnel 400 to the BTS 110 (step 416). Optionally, the respective R6 manager(s) 200, 204 may transmit KEEPALIVE messages after each timeout for a number of timeouts.

Expiration of a respective receive keepalive timer indicates that a problem exists with the data path tunnel (400) or gateway/BTS. In response, the respective R6 interface manager initiates one or more actions. Examples of such actions may include, but are not limited to, those described below.

In the event that one or more components within the ASN gateway 112 determines the gateway is not operating correctly, (i.e., sufficient trouble to warrant shutdown or error notification), the R6 manager 204 generates and transmits a STATUS message (a RX_DOWN status message indicating the local data receiving module is down) to the R6 manager 200 in the BTS 110. In response, the BTS 110 may perform any appropriate action, as desired. Such action may include notifying the AT 106, initiating a handoff for the AT 106 to connect with another BTS 110, and/or reassigning a new data tunnel between the BTS and ASN gateway, etc.

Similarly, in the event that one or more components within the BTS 110 determines the BTS is not operating correctly, (i.e., sufficient trouble to warrant shutdown or error notification), the R6 manager 200 generates and transmits a STATUS message (a RX DOWN status message indicating the local data receiving module is down) to the R6 manager 204 in the ASN gateway 112. In response, the ASN gateway 112 may perform any appropriate action, as desired.

A similar keepalive process may be provided for the control plane. This process may include the same or similar steps and functions as those described above with respect to the data plane keepalive process illustrated in FIG. 4 (and textually described above) However, in the control plane keepalive process, traffic flows between the BTS 110 and ASN gateway 112 take place via the control plane (or possibly a control path tunnel) and the keepalive messages flow therethrough (i.e., external to the data path tunnel 400). In this process, the KEEPALIVE message includes information uniquely identifying the first and second R6 management processes (through use of a unique function type identifier distinguishing it from other known peer applications currently defined in the WiMAX specifications).

Similar keepalive processes may be provided for other peer applications (APPLICATION). Each application utilizes its own control path tunnel for communication between the peer pair over the R6 interface. Thus, the same or similar process as described above may be implemented for the peer applications.

Additional management processes may be implemented in response to various protocol status messages transferred between the BTS 110 and the ASN gateway 112.

In the event the BTS 110 exits the ASN 102, the R6 manager 200 generates and transmits a STATUS message (an EXIT status message indicating a request to delete the tunnel/connection) to the R6 manager 204 in the ASN gateway 112. The data path function 206 within the ASN gateway 112 receives a release instruction and releases the data path tunnel, while the data path function 202 in the BTS 110 receives a release instruction and releases the data path tunnel. After data path release, the ASN gateway 112 generates and transmits a STATUS message (an EXITED status message indicating the tunnel is deleted) to the R6 manager 200 in the BTS 110.

During normal operation, peer applications or processes are activated/executed in response to access requests from an AT or during an established communication session involving an AT 106. Each peer application or process is a functional entity comprising two portions—one portion executing within the ASN gateway 112 and another portion executing within the BTS 110. Examples of peer applications or peer processes include a radio resource (RR), handover, quality of service (QOS), paging, extensible authentication protocol (EAP), R3 mobility, accounting, security and context delivery.

In one embodiment, the format and structure of the messages defined within the R6 management protocol are in accordance with WiMAX standards or specifications. Such messages are usually transmitted with UDP control headers over IP for the control plane. KEEPALIVE messages carried via the data path 4000 may be in accordance with any format compatible with the data path tunnel.

The current version of the WiMAX NWG Stage 3 Messaging Format standard/specification (Aug. 6, 2006) identifies the structure and format of messages carried over the R6 interface (via UDP connection) Because the Stage 2 model consists of functional entities communicating with their peers to realize specific control functions, it becomes necessary to specify messaging between the peer functional entities. These messages comprise a message header and message body. The message header identifies a type field including a function type field and message type field. The function type indicates independent functions (e.g., HO), while the message type indicates the message type corresponding to the function type e.g., HO-request) Thus, the messaging scheme is organized by functions or peer applications (APPLICATION).

The present disclosure introduces a common management protocol including a common set of message types, as described above, that may be used for data plane, control plane, and individual peer applications communicating over the control plane. Keepalive procedures or processes are also introduced.

The data elements—for the new messages, as well as the message types for the STATUS messages, are conveyed using the type-length-value (TLV) field of the message.

The R6 interface managers 200, 204 may be embodied as software processes that executes within the respective gateway 112 and BTS 110 as a software process component of the overall hardware/software system configuration for these devices. However, the R6 interface managers 200, 204 may also be constructed of one or more discrete hardware/software components that interoperate with the other components of the gateway 112 and/or BTS 110.

In one embodiment, the processes and system described herein operate in accordance with the WiMAX standard(s) (802.16e-2005, NWG Stage 2, 3) However, the concepts and teachings herein may be utilized with other protocols or specifications.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
executing, using a base station, a management process associated with an R6 interface between the base station and an access services network (ASN) gateway; and
monitoring, using the base station, the R6 interface during execution of the management process associated with the R6 interface for determining a status of R6 interface communications between the base station and the ASN gateway.

2. The method of claim 1 further comprising receiving, using the base station, one or more status messages from the ASN gateway.

3. The method of claim 2, wherein the one or more status messages comprises at least one of:
a WAIT_KEEPALIVE status message;
a KEEPALIVE_TIMEOUT status message;
a NORMAL status message;
an RX_DOWN status message;
an EXIT message; or
an EXITED message.

4. The method of claim 1 further comprising:
establishing, using the base station, a data path tunnel between the base station and the ASN gateway over a data network; and
sending, using the base station, one or more KEEPALIVE messages through the data path tunnel to the ASN gateway.

5. The method of claim 1, wherein executing the management process associated with the R6 interface further comprises:
sending, using the base station, one or more KEEPALIVE messages to the ASN gateway via an R6 control plane using User Datagram Protocol (UDP) over Internet Protocol (IP).

6. The method of claim 5, wherein one or more KEEPALIVE messages includes information uniquely identifying the management process associated with the R6 interface and a second management process associated with the ASN gateway.

7. The method of claim 5 further comprising:
sending, using the base station, a first KEEPALIVE message after a first predetermined time period has elapsed within a send keep-alive timer;
resetting, using the base station, a receive keep-alive timer in response to receiving a KEEPALIVE message via the R6 control plane; and
initiating, using the base station, one or more actions in response to failing to receive a KEEPALIVE message prior to expiration of the receive keep-alive timer.

8. The method of claim 7, wherein at least one of the one or more actions comprises at least:
initiating a handoff for an associated access terminal (AT) connected to the base station to connect with another base station; or
reassigning a new data tunnel between the base station and the ASN gateway.

9. A method comprising:
executing, using an access services network (ASN) gateway, a management process associated with an R6 interface between the ASN gateway and a base station; and
monitoring, using the ASN gateway, the R6 interface during execution of the R6 management process for determining a status of R6 interface communications between the ASN gateway and the base station.

10. The method of claim 9 further comprising receiving, using the ASN gateway, one or more status messages from the base station.

11. The method of claim 10, wherein the one or more status messages comprises at least one of:
a WAIT_KEEPALIVE status message;
a KEEPALIVE_TIMEOUT status message;
a NORMAL status message;
an RX_DOWN status message;
an EXIT message; or
an EXITED message.

12. The method of claim 9 further comprising:
establishing, using the ASN gateway, a data path tunnel between the ASN gateway and the base station over a data network; and
sending, using the ASN gateway, one or more KEEPALIVE messages through the data path tunnel to the base station.

13. The method of claim 9, wherein executing the management process associated with the R6 interface further comprises:
sending, using the ASN gateway, one or more KEEPALIVE messages to the base station via an R6 control plane using User Datagram Protocol (UDP) over Internet Protocol (IP).

14. The method of claim 13, wherein one or more KEEPALIVE messages includes information uniquely identifying the management process associated with the R6 interface and a second management process associated with the base station.

15. The method of claim 13 further comprising:
sending, using the ASN gateway, a first KEEPALIVE message after a first predetermined time period has elapsed within a send keep-alive timer;
resetting, using the ASN gateway, a receive keep-alive timer in response to receiving a KEEPALIVE message via the R6 control plane; and
initiating, using the ASN gateway, one or more actions in response to failing to receive a KEEPALIVE message prior to expiration of the receive keep-alive timer.

16. The method of claim 15, wherein at least one of the one or more actions comprises at least:
setting, using the ASN gateway, an internal status to KEEPALIVE_TIMEOUT; or
transmitting, using the ASN gateway, an RX_DOWN status message to the base station.

17. A method comprising:
monitoring a data plane of an R6 reference point within an access services network (ASN) between base station and an ASN gateway, the monitoring comprising:
establishing, using the ASN gateway, a data path tunnel between the ASN gateway and a base station over a data network associated with the R6 reference point; and
sending, using the ASN gateway, one or more KEEPALIVE messages through the data path tunnel to the base station, the sending comprising sending a first KEEPALIVE message when no user data messages have been sent and no other KEEPALIVE messages have been sent during a first predetermined period of time.

18. The method of claim 17, wherein the establishing further comprises establishing the data path tunnel using User Datagram Protocol (UDP) over Internet Protocol (IP).

19. The method of claim 17, wherein the establishing further comprises:

receiving, using the ASN gateway, an INITIALIZATION message from the base station, the INITIALIZATION message from the base station including parameters comprising at least:
   a proposed path IDentification (ID);
   at least one keepalive time period; and
   a maximum protocol data unit (PDU) size
generating, using the ASN gateway, an INITIALIZATION message, the INITIALIZATION message generated by the ASN gateway comprising at least one accepted parameter associated with the INITIALIZATION message from the base station; and
transmitting, using the ASN gateway, the INITIALIZATION message generated by the ASN gateway to the base station.

20. The method of claim 19, wherein the data path tunnel is established based, at least in part, on the parameters included in the INITIALIZATION message from the base station.

21. An access services network (ASN) gateway system comprising:
   at least one processor; and
   one or more computer-readable memory storage hardware devices comprising processor-executable instructions which, responsive to execution by the at least one processor, are configured to enable the ASN gateway to perform operations comprising:
      monitoring a data plane of an R6 reference point within an ASN between a base station and the ASN gateway, the monitoring comprising:
         establishing, using the ASN gateway, a data path tunnel between the ASN gateway and a base station over a data network associated with the R6 reference point; and
         sending, using the ASN gateway, one or more KEEPALIVE messages through the data path tunnel to the base station, the sending comprising sending a first KEEPALIVE message when no user data messages have been sent and no other KEEPALIVE messages have been sent during a first predetermined period of time.

22. The ASN gateway system of claim 21, wherein the establishing further comprises establishing the data path tunnel using User Datagram Protocol (UDP) over Internet Protocol (IP).

23. The ASN gateway system of claim 22, wherein the establishing further comprises:
   receiving, using the ASN gateway, an INITIALIZATION message from the base station, the INITIALIZATION message from the base station including parameters comprising at least:
      a proposed path IDentification (ID);
      at least one keepalive time period; and
      a maximum protocol data unit (PDU) size
   generating, using the ASN gateway, an INITIALIZATION message, the INITIALIZATION message generated by the ASN gateway comprising at least one accepted parameter associated with the INITIALIZATION message from the base station; and
   transmitting, using the ASN gateway, the INITIALIZATION message generated by the ASN gateway to the base station.

24. The ASN gateway system of claim 23, wherein the data path tunnel is established based, at least in part, on the parameters included in the INITIALIZATION message from the base station.

* * * * *